Nov. 5, 1935.  C. E. COLLIN  2,020,104

COFFEE PERCOLATOR

Filed July 25, 1934  2 Sheets-Sheet 1

INVENTOR:
Charles E. Collin,
BY Swenarton,
his ATTORNEY

Nov. 5, 1935.  C. E. COLLIN  2,020,104
COFFEE PERCOLATOR
Filed July 25, 1934  2 Sheets-Sheet 2
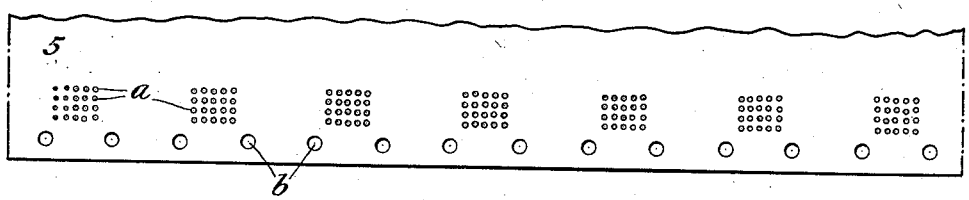
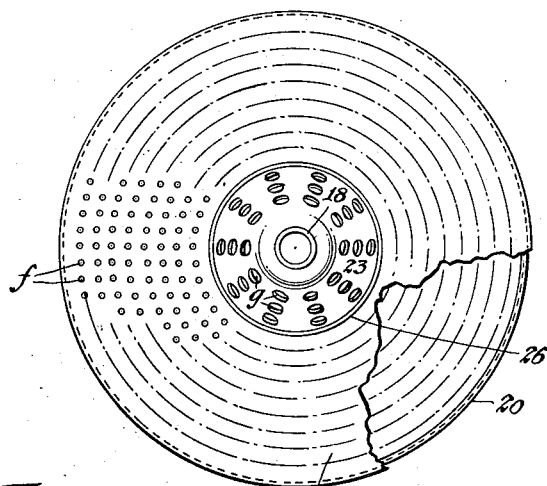
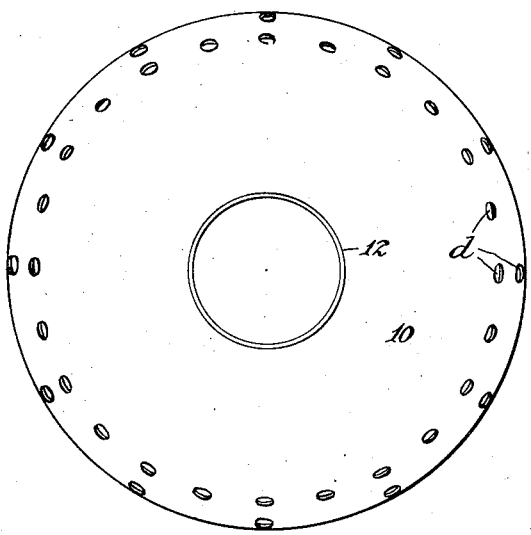  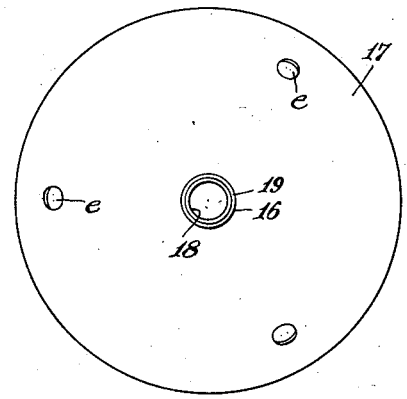
INVENTOR:
Charles E. Collin,
BY *Swenarton*,
his ATTORNEY.

Patented Nov. 5, 1935

2,020,104

UNITED STATES PATENT OFFICE 2,020,104

COFFEE PERCOLATOR

Charles E. Collin, Hastings-on-Hudson, N. Y.

Application July 25, 1934, Serial No. 736,818

3 Claims. (Cl. 53—3)

This invention relates to coffee percolators, either of the ordinary type, such as is adapted to be heated on a range, or of the electric type and has for its principal objects the provision of a cheap, attractive and highly effective percolator which is so constructed that liquid therein will not accidentally boil over and discharge the contents, either through the spout or cover, over the surrounding surface of the stove or table on which the percolator is placed, besides having other advantages as hereinafter set forth.

I am aware, as set forth in Patents Nos. 879,096, 94,767 and 95,056 that it has been proposed to provide various deflecting elements and separators to accomplish the more effective circulation of the liquid in a percolator and even, as stated in the last patent, to prevent the boiling of the main body of the liquid coffee, but none of these constructions possesses all of the various advantages of my improved percolator as herein set forth.

In the accompanying drawings, in which I have illustrated a preferred embodiment of my invention Figure 1 is a plan view of my improved coffee percolator;

Fig. 3 is a fragmentary developed view of the side wall of the deflector carried by the cover;

Fig. 4 is a top plan view of the coffee basket with the fountain positioned therein;

Fig. 5 is plan view of the separator member isolated; and

Fig. 6 is a plan view of the fountain tube.

Figure 1:
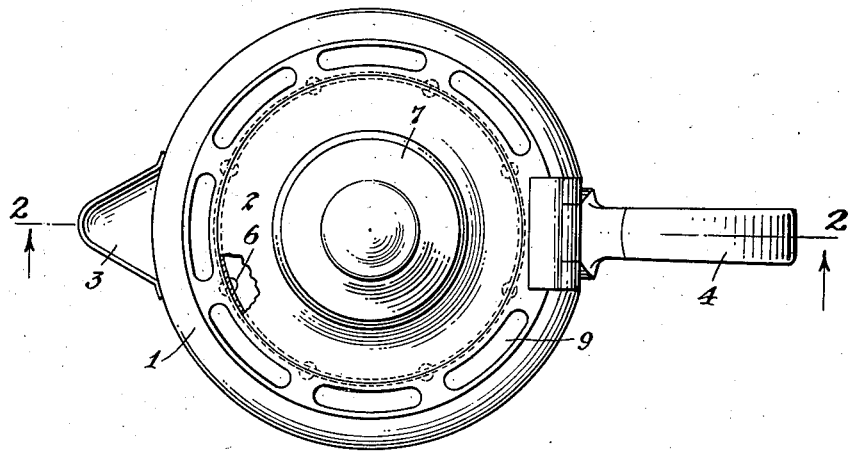

Referring to the drawings and the construction shown therein, the numeral 1 designates a coffee pot of conventional design, the same having a hinged cover 2 which has a spout 3 and handle 4. A centrally disposed, depending deflector member 5 that is substantially spaced from the side walls of said pot is secured by rivets 6 to said cover and is closed at its top by a removable glass dome 7 of common construction, which dome, being transparent, admits of inspection of the turbulent coffee in the condensation chamber M without necessitating the opening of the cover, while the depending skirt 8 thereof also functions as a deflector.

Said deflector 5 has a series of groups of apertures $a$ arranged at intervals peripherally around the mid-section of the deflector, these apertures being of the conventional size employed in coffee baskets of ordinary percolators, viz about $\frac{1}{24}''$. Adjacent to the bottom of said skirt is another series of apertures $b$ of considerably larger size than the former apertures $a$, namely being about $\frac{3}{16}''$ in diameter. Said apertures $b$ serve to admit of the free drainage of water through deflector 5 into a heat insulated chamber N, which constitutes the finished coffee compartment wherein all steam escaping from apertures $a$ is condensed to liquid so that no visible amount passes either through the large air circulation slots 9 which are provided in the cover or through the strainer apertures $c$ that afford communication between the chamber N and said spout. Said apertures $c$ are preferably arranged in a substantially V-shaped group, in accordance with the customary practice, the uppermost apertures being disposed at a substantial distance below the top level of the spout.

A removable separator element 10, which is of a generally truncated cone-like configuration and has a circular skirt 11 at the bottom thereof and a circular terminal neck 12, is adapted to be inserted into the pot and rest upon an internal bead 13 formed on the side wall of the body. Said separator is provided with rows of relatively large apertures $d$ positioned immediately above the top of said skirt 11, which apertures afford communication between the chamber N and the main ebullition chamber $o$ within said separator 10. The bottom of the pot below the said bead 13 is preferably outwardly flared so as to afford a base portion 14, the bottom 15 of which is of considerably larger area than the cross-sectional area of the body in the plane of said bead 13 and thereby any tendency of the burner flames to lick up over the sides of the pot and effect active ebullition of the liquid which collects in chamber N can be prevented. A fountain tube 16, having a hollow convex base 17 which forms a small ebullition chamber Y, is adapted to be centrally positioned within said deflector element. Said tube has a reduced upper end 18 which affords an intermediate shoulder 19. The base of said tube is provided with a series of marginal apertures $e$ which afford communication with the large ebullition chamber X.

A coffee basket 20, having removable cover 21, is adapted to be applied to the top of said deflector element 10 and to be supported thereby. The sides, bottom and top of said basket are formed of perforated metal, the apertures $f$ thereof corresponding in size substantially to the aforesaid apertures $a$. Said basket has a cylindrical central sleeve 22 which terminates in a nose 23, also of a truncated cone-like configuration, and which nose has a depending integral sleeve 24 which is slightly flared at its bottom 25 which facilitates the penetration of the upper end 18 of said fountain tube thereinto during the positioning of the basket in the said separator 10, being of just sufficient length so that, when the bottom of the sleeve 22 is resting on the extreme upper end of the truncated cone-like portion of the deflector 10, the bottom of said skirt will then rest upon the shoulder 19.

As shown, the cover 21 of the basket has a central aperture, that is surrounded by an upturned flange 26, and is of just sufficient size to receive the sleeve 22 when said cover is applied to the basket; also said cover has a marginal flange 27 which is adapted to overlap the reinforced upper rim of said basket when the cover is applied thereto. Said nose element 23 of the basket is provided with several rows of relatively large apertures g which extend peripherally thereof and which admit of the free escape of steam from the compartment O into the compartment within the deflector 5 from which the uncondensed steam escapes thru the apertures b, as aforesaid, into the chamber N. Said pot is provided with a handle 4 of any suitable design, the same being formed of heat-insulated material such as wood, or of suitable composition material.

As above explained, the cylindrical bottom 11 of the separator 10 extends completely across the pot and continually engages the bead 13 upon which it is supported, thereby blocking the free direct upward circulation of liquid from the chamber X to the chamber N, from the direct influence of heat applied to the bottom of the pot and consequently all active ebullition of the liquid will be confined to the aforesaid ebullition chambers X and Y.

Figure 2:
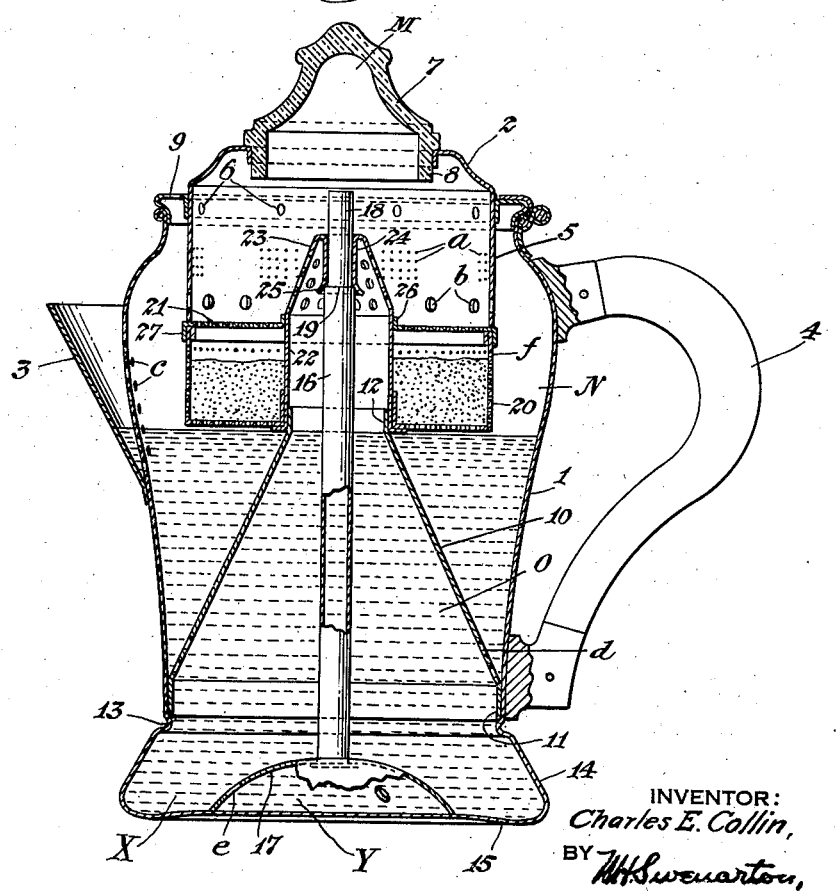
Fig. 2 is a vertical section on the line 2—2 of Fig. 1.

In the production of coffee in my improved percolator either the measured amount of water is first introduced into the empty percolator prior to the insertion of the fountain tube, the deflector element and the coffee basket or else the fountain tube is first centrally positioned in the pot in the position shown in Fig. 2, and then the deflector is positioned on the bead 13 and the coffee basket containing the requisite amount of ground coffee and with the cover applied thereto, is positioned on the top of said deflector and said fountain tube, and then immediately prior to closing the cover, the measured amount of water is introduced into the chamber N. In the latter case the water so introduced will pass through the apertures d into the chamber X and thence through the apertures e into the chamber Y, completely filling the latter.

Following the introduction of the liquid and the assembly of the internal parts, including coffee basket, containing the measured quantity of ground coffee beans, the cover is closed and heat applied to the bottom 15 of the percolator from a gas flame or, in the case of an electric percolator, from a resistance heating coil. Owing to the construction of my improved percolator the rapidity with which the heat is applied from an open flame is immaterial, since even when the usual gas burner flame is turned on full the pot will not boil over, so to speak, for the reasons hereinafter explained. As soon as sufficient heat has been applied to cause the water in the bottom of the chambers X and Y to boil, the fountain tube will commence to function and cause the projection of the boiling water up through said tube into the chamber M from which it is deflected by the walls thereof downwardly and is evenly distributed over the top of the coffee basket, passing through the perforations therein into the ground coffee berries with which such basket is charged, and escaping therefrom through the perforated sides and bottom of the basket into the chamber N, thence re-circulating through apertures d and e to the chambers X and Y whereupon the cycle of circulation will be repeated again and again until the coffee is finished.

Owing to the employment of the fountain tube, no appreciable amount of liquid will be projected upwardly from the chamber O through the sleeve 22 during the preparation of the coffee, but steam issuing from the liquid within said chamber O will be permitted to freely escape through the apertures in the nose 23. Such steam together with the steam issuing from the top of the fountain tube will either be condensed within the deflector 5 or will escape through the apertures b and owing to the relatively large air space between the deflector 5 and the vertical walls of the percolator and the free circulation of air afforded therein will therefore be almost immediately condensed so that virtually no steam will escape through the annular series of slots 9 of the cover as aforesaid. The effective condensation of the steam constitutes one of the important features of my invention, since it precludes any substantial evaporation of the water during the period of preparation of the coffee and consequently, with the exception of a relatively small amount of liquid, say about half-cup, which is absorbed or retained by the ground coffee in the basket, all of the original water is converted into coffee without any appreciable loss; for example, about 5½ cups of coffee can be recovered from 6 cups of water originally introduced into the pot.

The liquid coffee draining into the heat-insulated chamber from the coffee basket will lie quiescent and will merely simmer without substantial foaming. This is due to the fact that since the separator 10 extends completely across the pot at a level substantially above the bottom thereof, the liquid in the chamber N will be substantially removed from the flame or the zone of maximum heat and also will be subjected to the cooling action of the external air circulating around the vertical walls of the pot, particularly since, as previously stated herein, the flame cannot lick up over the sides of the pot owing to the flared configuration of the bottom thereof.

Due to the total prevention of active ebullition of the coffee in the chamber N owing to the manner of the preparation of the same, the aroma and taste of the coffee prepared in my improved percolator will be decidedly superior to coffee prepared in ordinary percolators wherein the entire body of the liquid in the pot attains the same temperature and the steam with the entrained aroma and volatile extracts can freely escape from the freshly prepared coffee, either through the top or side of the percolator. Furthermore, due to its simplicity and to the ease with which the parts can be removed the entire percolator can be maintained in a clean and sanitary condition.

The liquid in the chamber X serves as a reserve supply to feed water to the chamber Y in the base of the fountain tube and therefore, due to the fact that there is always sufficient liquid in the chamber Y to completely fill the same, it becomes unnecessary to control or limit the amount of heat supplied from a gas burner or resistance heating coil, as there is no possibility of small chamber Y running dry of liquid, so to speak, as would be the case were such a construction as that described in Patent 879,096, for example, placed over the ring gas burner when the same was turned on full.

Owing to the relatively large slots 9 in the cover of the percolator, not only, as previously stated, is the temperature in the space immediately surrounding the basket and the deflector 5 maintained at a point which permits condensation of the steam issuing through the apertures $a$, $b$ or $g$, but there is no possibility of sufficient steam accumulating under the cover to slightly raise or even blow off the cover, and consequently, as previously stated, there is virtually no loss of liquid whatsoever by evaporation during the preparation of the coffee.

Preferably the extreme bottom of chamber N should not project within about 1½" of the bottom of the pot, thereby, regardless of the size of the flame applied, there is little possibility, if any, of the heat from such flame directly influencing the temperatures of the liquid in the chamber N since the heat imparted to the liquid in said chamber is principally conducted thereto from the fluid draining into such chamber from the coffee basket and from conduction through the wall of the separator 10 and consequently the liquid in the chamber N will never exceed a simmering temperature. This is of particular importance in the preparation of coffee since there is sufficient natural oil in the coffee berries to create a foam during the extraction of the extractable portions of the berry and if the liquid in the chamber N were to attain a temperature such that vigorous boiling or ebullition should occur, the amount of air or steam introduced into the liquid, as a result of circulating action of the fountain tube, would result in causing this foam to creep up the sides of the pot and the spout with the consequent spilling over of the same onto the stove or table on which the percolator is resting.

Preferably the lower cylindrical portion of the sleeve 24 immediately above the flared end thereof rests on the shoulder 19 of the fountain tube and thereby relieves the separator 10 from carrying the weight of said basket with the consequence that there is no tendency for the bottom of the sleeve 22 to become jammed on the tapered wall of the separator since it cannot extend below the cylindrical throat 12 of such separator. Consequently, the parts can be readily disassembled when it is desired to remove the same after the coffee-brewing operation is completed and in order that such parts may be cleansed.

The co-relation of the size as well as the number of the apertures in certain of the elements of the percolator is of the utmost importance. For example, I preferably provide thirty-six holes of about ⅛" diameter as represented by the reference letter $d$ at the bottom of the separator and the total area of these holes must be greater than the total cross section of the fountain tube, which is about ¼" in diameter, in order to insure that the chamber X will always contain sufficient water to supply such fountain tube, irrespective of how vigorously the water in the chambers X and Y is boiling. Likewise, the top of the fountain tube is preferably about ¼" in diameter and the diameter of each of three apertures is preferably ⅛" in diameter, whereby the total area thereof is greater than the cross section of the top outlet of the fountain tube, thus insuring that the chamber Y will never run dry, irrespective of how vigorously the water may be boiling therein.

The apertures $b$ in the deflector 5 are sufficient in number, about 36, for example, being employed, to admit of the free drainage of liquid from the cover of the basket in the event the percolation thereof through the cover becomes clogged or retarded sufficiently to attain the level of such apertures $b$ and these apertures are so located that the bottom thereof is on a level below the bottom of the lowest row of apertures $g$ of the nose 23 and yet sufficiently above the level of the basket cover to permit of the collection of a substantial body of liquid on the top of the basket and thus retarding the free escape of the liquid without passage through the basket cover until such time as the liquid accumulates to such an extent that unless such drainage could occur through the apertures $b$ the openings $g$ would be choked by the liquid and an undue pressure or even a reverse circulation within the percolator would be induced.

This application is a continuation in part of applicant's companion application Ser. No. 723,458 filed May 2, 1934.

Various changes within the scope of the appended claims may be made without departing from the spirit of my invention.

Having thus described my invention, what I claim and desire to obtain by United States Letters Patent is:—

1. In a coffee percolator, the combination comprising a main receptacle, a removable cover therefor having a condensation dome, a separator member, mounted in said receptacle, which is substantially coextensive in cross section, adjacent the bottom thereof, with that portion of the main receptacle into which such separator is adapted to project, a fountain tube having a bell-shaped lower end, adapted to be positioned within said separator, a metal coffee basket having perforated top, bottom and side wall, said basket having a central sleeve adapted to embrace said separator adjacent its upper end, said sleeve having a considerable number of relatively large apertures which serve to prevent undue accumulation of pressure within said sleeve, a deflector member carried by said cover and depending therefrom, said deflector having a considerable number of relatively large drainage openings for liquid and a large number of apertures of smaller size at a level above said drainage openings sufficient to prevent undue accumulation of sufficient steam pressure immediately beneath said condensation dome to displace the cover upwardly, irrespective of how vigorously the water beneath the bell-shaped base of the fountain is boiled, and said cover being provided with an annularly disposed series of relatively large apertures which afford communication between the external air and the space immediately surrounding said depending deflector member, whereby due to the free entrance of air the temperature of such space is maintained therein below the vaporization point of water and condensation of steam issuing through the apertures in the wall of said deflector is promoted.

2. In a coffee percolator the combination comprising a main receptacle, a cover therefor, a separator element having upwardly converging sides and which serves to sub-divide the body of the percolator into a central ebullition chamber and a finished coffee chamber, a fountain tube, a coffee basket formed of perforated metal and having a small top central sleeve adapted to snugly embrace said fountain tube and another larger sleeve, centrally disposed on said basket for positioning the same on the upper end of said separator, a deflector carried by the cover of the percolator and depending therefrom that is substantially co-extensive in cross section with the coffee basket adjacent its top, said deflector being adapted to engage the top of the coffee basket when the cover of the percolator is in a closed position and said deflector having a series of small apertures and also a series of relatively large apertures, the latter being disposed adjacent but above the bottom of the deflector and serving to maintain a liquid seal over the top of the coffee basket while preventing undue accumulation of water on the top of such basket and sufficient to interfere with the normal cycle of circulation in the percolator.

3. In a coffee percolator the sub-combination comprising a main receptacle, a separator element sub-dividing the same into two compartments, in concentric relation with each other and the outer compartment being elevated a substantial distance above the bottom of the main receptacle, a fountain tube, a coffee basket of perforated metal surrounding said tube at the upper end thereof, said coffee basket having a central sleeve adapted to embrace the separator at the upper end of the latter and a second small depending sleeve adapted to embrace said fountain tube adjacent its upper end, said separator, the base of said fountain tube and said central sleeve on said basket which is adapted to embrace said separator all having relatively large apertures therein, the apertures in the separator being disposed adjacent the bottom thereof and having a total area in excess of the total area of the apertures in the base of the fountain tube.

CHARLES E. COLLIN.